(12) United States Patent
Sung et al.

(10) Patent No.: US 6,618,214 B2
(45) Date of Patent: Sep. 9, 2003

(54) COLOR WHEEL HAVING ADHESIVE-ESCAPE-PREVENTION MEANS

(75) Inventors: Shu-Wen Sung, Hsin-Chu (TW); Hsien-Chang Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 09/683,977

(22) Filed: Mar. 7, 2002

(65) Prior Publication Data

US 2003/0011911 A1 Jan. 16, 2003

(30) Foreign Application Priority Data

Jul. 13, 2001 (TW) .................................. 90212025 U

(51) Int. Cl.⁷ .............................. G02B 5/22; G02B 7/00
(52) U.S. Cl. .................... 359/892; 359/891; 359/885; 362/293
(58) Field of Search ................ 359/891, 892, 359/885; 362/293, 322, 323

(56) References Cited

U.S. PATENT DOCUMENTS 6,024,453 A * 2/2000 Edlinger .................. 353/84

\* cited by examiner

Primary Examiner—John Juba
Assistant Examiner—Leo Boutsikaris
(74) Attorney, Agent, or Firm—Winston Hsu

(57) ABSTRACT

A color wheel comprising a carrier having a central axis, a first principal surface, and a periphery, the carrier being rotatable around the central axis; and a filter assembly having a first principal surface and having the central axis as its central axis, wherein the first principal surface of the carrier is adjacent to the first principal surface of the filter assembly, the first principal surface of the carrier includes a carrier bonding zone, the first principal surface of the filter assembly includes a filter bonding zone, the carrier bonding zone and the filter bonding zone are bound together by an adhesive, a loop-shaped groove is formed around the carrier bonding zone or the filter bonding zone and is innerly apart from the periphery so that an excessive portion, if any, of the adhesive can flow into the loop-shaped groove.

3 Claims, 2 Drawing Sheets

COLOR WHEEL HAVING ADHESIVE-ESCAPE-PREVENTION MEANS

BACKGROUND OF INVENTION

1. Field of the Invention

The present invention relates to a projection display system, and more particularly to a color wheel having adhesive-escape-prevention means for use in a projection display system.

2. Description of the Related Art

U.S. Pat. No. 5,868,482 discloses a color wheel that is complicated in structure and wherein the adhesive between the carrier 11 and the filter assembly 12 can escape and flow onto a filter film 17 and can thus result in a contaminated and low quality filter.

To resolve the above-mentioned problem of the color wheel, the inventors of the present invention got an idea to form, at a suitable distance from the periphery of the carrier, a circular-loop-shaped adhesive-escape-prevention groove on the inner surface of the carrier so that in the manufacturing process, the excessive adhesive between the carrier and the filter assembly 12 may flow into the circular-loop-shaped adhesive-escape-prevention groove rather than onto a filter film.

SUMMARY OF INVENTION

An object of the invention is to provide a color wheel wherein a circular-loop-shaped adhesive-escape-prevention groove is formed on the inner surface of the carrier so that the excessive adhesive between the carrier and the filter assembly may flow into the circular-loop-shaped adhesive-escape-prevention groove rather than onto a filter film.

To achieve the above and other objects, the present invention provides a color wheel comprising a carrier having a central axis, a first principal surface, and a periphery, the carrier being rotatable around the central axis; and a filter assembly having a first principal surface and having the central axis as its central axis, wherein the first principal surface of the carrier is adjacent to the first principal surface of the filter assembly, the first principal surface of the carrier includes a carrier bonding zone, the first principal surface of the filter assembly includes a filter bonding zone, the carrier bonding zone and the filter bonding zone are bound together by an adhesive, a loop-shaped groove is formed around the carrier bonding zone or the filter bonding zone and is apart from the periphery so that an excessive portion, if any, of the adhesive can flow into the loop-shaped groove.

BRIEF DESCRIPTION OF DRAWINGS

The above and other objects, advantages, and features of the present invention will be understood from the following detailed description of the invention when considered in connection with the accompanying drawings below.

DETAILED DESCRIPTION

Figure 1:
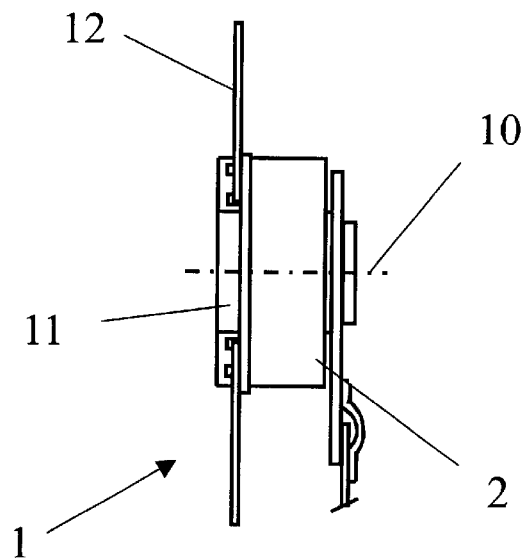
FIG. 1 is a schematic elevational view showing the combination of a color wheel in accordance with a preferred embodiment of the present invention and a motor.

Referring to FIG. 1, a color wheel 1 in accordance with a preferred embodiment of the present invention comprises a substantially disc-shaped carrier 11 and a disc-shaped filter assembly 12. The color wheel 1 is mounted on the rotation shaft (not shown) of a motor 2 and is rotatable around the axis 10 of the shaft. The disc-shaped filter assembly 12 comprises, for example, four filter segments 12a to 12d, as shown in FIG. 3, wherein each of the filter segments consists of, for example, a fan-shaped glass plate coated with a filter film (not shown) of a predetermined color.

Figure 2:
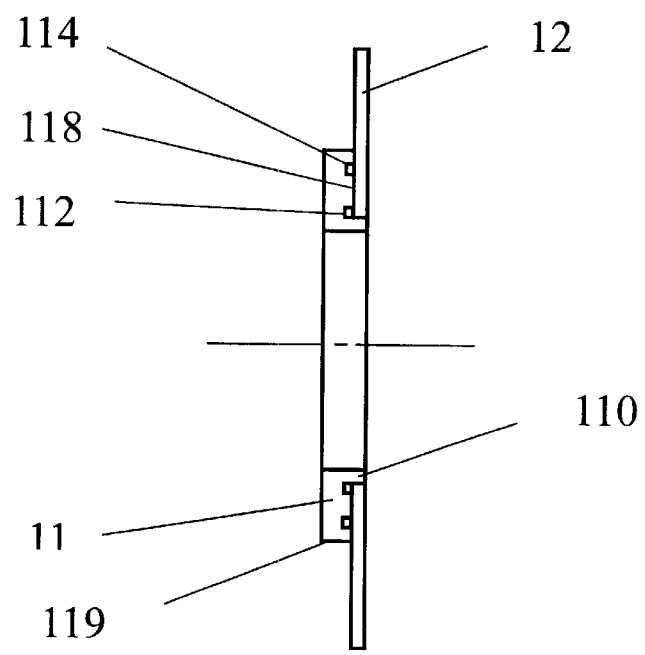
FIG. 2 is a schematic view showing the radial cross section of the color wheel after removing the motor from FIG. 1.
Figure 3:
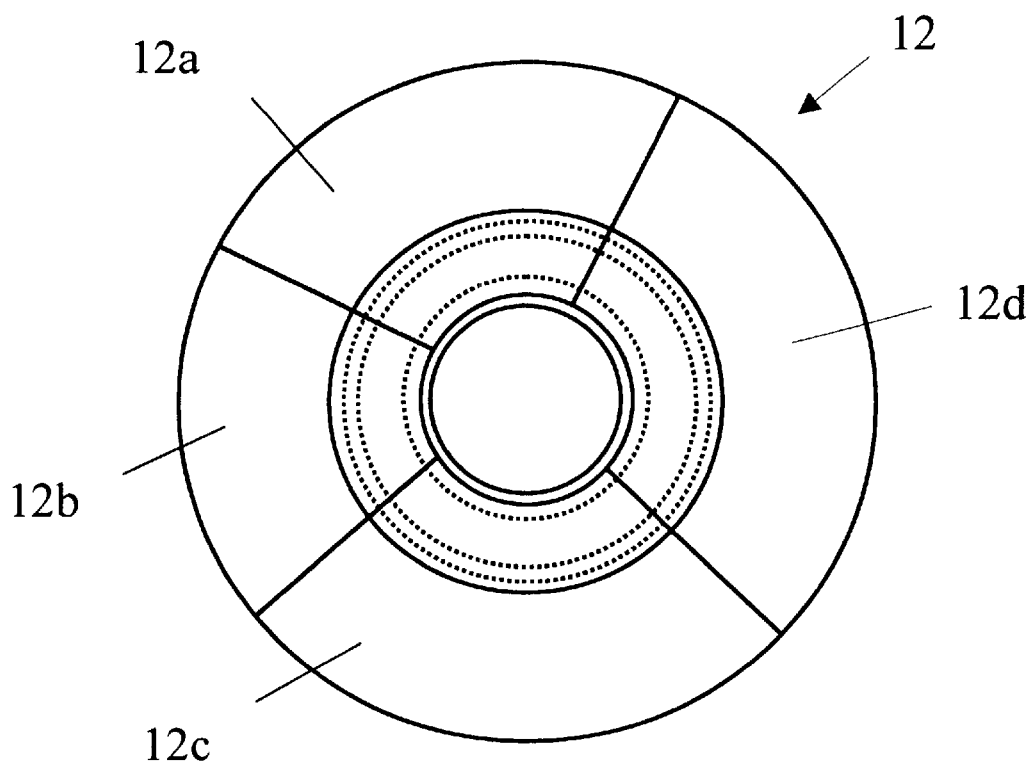
FIG. 3 is a schematic view from the right side of the color wheel as shown in FIG. 2.
Figure 4:
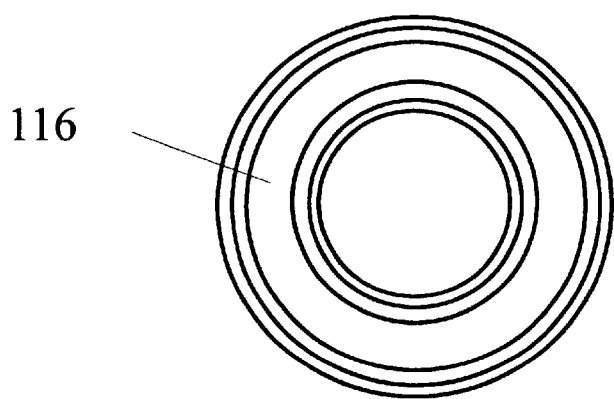
FIG. 4 is a schematic view showing the carrier after removing the disc-shaped filter assembly as shown in FIG. 3.

Referring to FIGS. 2 to 4, the disc-shaped carrier 11 has a central flange 110, an inner circular-loop-shaped groove 112, and an outer circular-loop-shaped groove 114. The inner circular-loop-shaped groove 112 is for the purpose of conveniently forming the central flange 110. The inner surface portion of the disc-shaped carrier 11 that is to the outer side of the inner circular-loop-shaped groove 112 and to the inner side of the outer circular-loop-shaped groove 114 forms a ring-shaped bonding zone 116. An adhesive layer 118 is applied on the bonding zone 116 to glue together the disc-shaped carrier 11 and the disc-shaped filter assembly 12 to form the color wheel 1. The color wheel 1 may be, for example, glued to the rotor (not shown) of the motor 2 in a conventional way. The outer circular-loop-shaped groove 114 is at a suitable radial distance from the periphery 119 of the disc-shaped carrier 11, and is formed with a suitable depth (e.g. 0.2 mm) and width (e.g. 0.5 mm) so that excessive escape portion of the adhesive 118 applied in between the disc-shaped carrier 11 and the disc-shaped filter assembly 12 can flow into the outer circular-loop-shaped groove 114. Therefore, the problem that excessive escape portion of the adhesive 118 can flow onto the transparent area of the color wheel 1 and contaminate the disc-shaped filter assembly 12 is avoided.

While a preferred and particular embodiment of the present invention have been described herein for purposes of illustration, many modifications and changes will become apparent to those skilled in the art. For example, a circular-loop-shaped groove formed on the surface, which faces the disc-shaped carrier 11, of the disc-shaped filter assembly 12 may be used to replace the outer circular-loop-shaped groove 114. Obviously, the object of the invention can also be achieved by this modification. Moreover, forming a square-loop-shaped groove to replace the outer circular-loop-shaped groove 114, or using an integrally formed filter to replace the four filter segments 12a to 12d obviously falls within the true spirit and scope of this invention. Accordingly, the appended claims are intended to encompass all such modifications and changes as fall within the true spirit and scope of this invention.

What is claimed is:

1. A color wheel comprising:

a substantially disc-shaped carrier having a central axis, a first principal surface, and a periphery, the carrier being rotatable around said central axis; and a substantially disc-shaped filter assembly having a first principal surface and having said central axis as its central axis, wherein a loop-shaped groove is formed at a predetermined distance from said periphery on the first principal surface of the said carrier, the first principal surface of said carrier includes a bonding zone inside of said loop-shaped groove, an adhesive is applied on the bonding zone to glue together the first principal surface of the substantially disc-shaped carrier and the first principal surface of the substantially disc-shaped filter assembly, a loop-shaped groove is formed around the carrier bonding zone or the filter bonding zone and is at a predetermined radial distance from the periphery so that an excessive portion, if any, of the adhesive can flow into said loop-shaped groove.

2. A color wheel according to claim 1, wherein the substantially disc-shaped filter assembly comprises at least a filter segment extending in the radial direction of said substantially disc-shaped filter assembly and a portion of the at least a filter segment extends beyond the periphery.

3. A color wheel according to claim 1, wherein said loop-shaped groove is a circular-loop-shaped groove.

* * * * *

UNITED STATES PATENT AND TRADEMARK OFFICE
CERTIFICATE OF CORRECTION

PATENT NO. : 6,618,214 B2
DATED : September 9, 2003
INVENTOR(S) : Sung et al.

It is certified that error appears in the above-identified patent and that said Letters Patent is hereby corrected as shown below:

<u>Title page</u>.
Item [73], Assignee, "Coretronic Corporation, Hsin-Chu (TW)" should read
-- Young Optics Inc., Hsin-Chu (TW) --.

Signed and Sealed this

Fifteenth Day of June, 2004

JON W. DUDAS
*Acting Director of the United States Patent and Trademark Office*